UNITED STATES PATENT OFFICE.

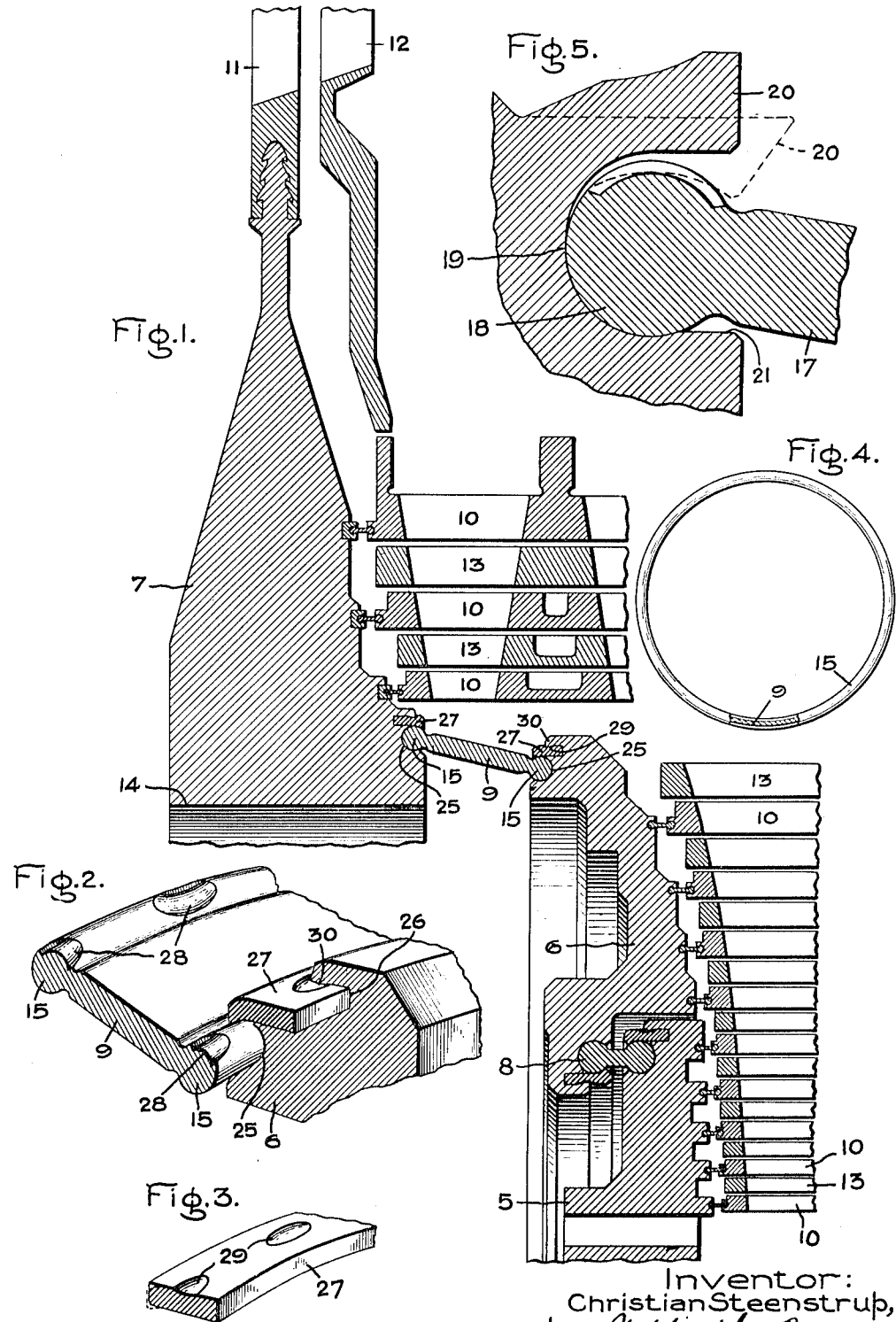

CHRISTIAN STEENSTRUP, OF SCHENECTADY, NEW YORK, ASSIGNOR TO GENERAL ELECTRIC COMPANY, A CORPORATION OF NEW YORK.

ELASTIC-FLUID TURBINE.

1,313,649.   Specification of Letters Patent.   Patented Aug. 19, 1919.

Application filed July 26, 1918. Serial No. 246,906.

*To all whom it may concern:*

Be it known that I, CHRISTIAN STEEN-STRUP, a citizen of the United States, residing at Schenectady, in the county of Schenectady, State of New York, have invented certain new and useful Improvements in Elastic-Fluid Turbines, of which the following is a specification.

The present invention relates to elastic fluid turbines and more especially to the expansion rings employed to unite the parts or members and especially parts of the rotor which have different ratios of expansion.

Briefly, the purpose of these rings is to permit of equal expansions of the connected parts without causing stresses due to said expansions being transmitted from one to the other, and also to prevent the free transfer of heat from one of said parts to the other. The rotor to which I have special reference comprises a number of concentric annular members each made of a steel forging which is heat treated to make it very hard and tough. These members are connected by expansion rings which are cylindrical or slightly conical in shape. The extremities or edges of the ring are enlarged to form anchoring devices, each of which is circular, considered in cross-section, for the greater part of its surface. Each device is located in sockets in the rotor members. In forming these sockets according to prior constructions, the mouth or entrance to the socket is initially machined large enough to permit the enlarged extremity or edges of the ring to be slipped into place, after which the lip forming one wall of the socket and an integral part of the forging is rolled into place to complete the socket and form a snug fit with the expansion ring.

After the rolling operation the metal wall of the socket should bear evenly over more than one-half of said ring extremity to prevent it from being pulled out and also to afford a suitable bearing surface on which the expansion ring as a whole can rock or move. When the rotor members are relatively small the formation of the sockets and the rolling operation while calling for exact workmanship do not present any serious difficulty. This is not so, however, when the parts are very large and heavy because the metal forming the lip has to have such a large section that it is liable to break during the rolling operation. Again if the lip does not break there is danger that the metal forming it and the socket will not bear uniformly on the enlarged end of the expansion ring and as this cannot be readily detected it is liable to go unnoticed to the detriment of the apparatus. If the rolling operation is not successful it means that the whole member must be discarded, and this after a very large amount of labor has been expended in its manufacture. Where the members are relatively small this is not so important although entailing a considerable expense, but when the members are very large and designed for high speed operation as in the present case, the cost of discarding them is prohibitive. In fact the low pressure or wheel elements or members, owing to their size and rigid specifications as to strength are very difficult to obtain since they can only be forged by a few concerns in this country.

My invention has for its object to provide an improved means for uniting parts of a turbine by expansion rings which is free from the objections above noted.

For a consideration of what I believe to be novel and my invention, attention is directed to the accompanying description and claims appended thereto.

In the drawing which illustrates one of the embodiments of my invention, Figure 1 is a partial axial section of a turbine rotor; Fig. 2 is a perspective view showing an expansion ring and the means for fastening it to a rotor member; Fig. 3 is a perspective of the holding ring or element which engages the enlarged edge of the expansion ring and forms part of the socket; Fig. 4 is a view in elevation of an expansion ring, and Fig. 5 is a sectional view on an enlarged scale illustrating the old integral lip construction.

The rotor is composed of a number of elements or members, of which 5 indicates the inner or high pressure member, 6 the intermediate pressure member and 7 the low pressure member. The member 5 is directly mounted on the turbine shaft (not shown) and the other members are secured one to the other by expansion rings 8 and 9. All of the members have the same axis and carry concentric rings of blades 10 through which steam flows radially outward, and in addition the member 7 carries radially extending blades 11 through which steam flows axially from the ring of stationary nozzles 12. The companion rotor (not shown) is similar in construction, rotates in the opposite direction and carries rings of blades 13 located between the rows of blades 10.

Owing to the heavy strains and stresses to which the member 7 is subjected it has to be made very massive especially in the region around its bore 14. In addition to this it is also heat treated to increase its strength. This treatment makes the metal very hard and consequently rather difficult to machine. It is especially difficult to roll the material when cold without cracking it, and it cannot be substantially heated because this would spoil the effect of the heat treatment. The other members should also be heat treated to increase their strength.

The expansion ring 9 is relatively large in diameter as shown and is also slightly conical although it may be cylindrical in some cases. The ring is also made of forged steel, heat treated and its extremities or edges are provided with circular enlargements 15 which serve as anchoring means and also as devices to transmit the torque, due to the action of the steam on the blades, to the supporting shaft.

Referring now to Fig. 5 which shows the old integral lip construction, 17 indicates the expansion ring; 18 one of its enlarged extremities, 19 the annular socket formed in the rotor member and 20 the lip which is formed integral with said member. This lip is machined to the general shape shown in full lines, and it is to be noted that the distance between it and the point 21 on the opposite side of the socket must be substantially equal to the diameter of the enlargement 18 to permit the latter to be inserted in place. This means that the lip 20 after the enlarged end of the expansion ring is inserted must be moved through a considerable distance to cause it to inclose said enlargement and complete the socket. This causes considerable stress on the metal and unless great care is taken the resulting socket wall will not be round, there being more pressure on the enlargement at one place than on another or the lip will crack near its base and ruin the rotor member. Another thing which has to be taken into account is the fact that the diameter of the lip which is cylindrical has to be changed, in this case reduced. In other words, the metal has to be put under such pressure as will cause it to flow to a limited extent as indicated by the dotted line position.

Referring now to my improved construction, a portion only of the annular socket 25 for the expansion ring is formed in each rotor member. Adjacent the socket portion thus formed is a relatively deep groove 26 which extends in an axial direction. In this groove is inserted a holding ring 27 whose outer portion forms the other part of the socket. The holding ring will usually be made of mild steel so that its outer edge can be easily rolled over to conform to the circular shape of the enlargement of the expansion ring. In some cases, however, it may be made of heat treated steel, but I regard it as the better practice to make the holding rings of somewhat softer metal than the rotor members. The ring may be made in one piece with or without joint or it may be composed of two or more segmental pieces depending upon the construction and relation of the expansion ring and associated rotor members. In some cases the holding ring may be inserted in place after the rotor member and expansion ring are assembled and in other cases before. When inserted before assembly the outer edge will have to be so shaped as to permit the enlargement 15 to be inserted in the socket. When inserted afterward the outer edge may be formed to the approximate shape. The former method is well adapted for use when the holding rings are of softer metal than the rotor members and the latter construction when the metals of the parts have substantially the same characteristics.

In order that the torque of the rotor member 7, due to the action of the steam on the blades, can be transmitted to the rotor member 6, the expansion ring 9 is provided with a plurality of axially extending grooves or depressions 28 into which the metal of the holding ring is rolled or forced so as to form in effect a plurality of keys. These grooves or key-ways and the keys should extend axially and the key ways should have the same axis as the enlargements so as not to interfere with the turning or rocking of the said enlargements in their sockets due to changes in diameter of the parts caused by unequal expansion. For the same reason the holding rings 27 are provided with shallow axially extending grooves or key slots 29 into which the metal of the rotor member is rolled or forced to form keys 30. It will thus be seen that the expansion rings are keyed to the holding rings and that the latter are keyed to the rotor members. Owing to the multiplicity of these keys each one only has to carry a small portion of the load and hence slight inaccuracies at this point are not of substantial importance.

It will be seen that owing to the use of the holding rings the metal forming the lip 31 of the hardened steel rotor does not have to be rolled, forced or moved but a very small amount from its normal position to cause it to grip said ring and hence there is no danger of cracking said lip and spoiling the rotor member.

My invention is shown applied to the rotating parts of a turbine since it has its greatest utility in this connection, but it can be used in connection with expansion rings arranged to compensate for unequal expansions wherever located, for example, those used to connect balancing disks to the rotor, etc. Although there is very little chance of the holding ring being injured in rolling the joint between it and the expansion ring, or a defective joint made, it is evident that said ring can be removed and a new one substituted and in this manner the rotor member is saved.

I have shown my improved construction applied to both ends of the expansion ring as 9, since it is the better practice, but under certain conditions the construction may be applied only to the end which carries the big wheel or rotor 7.

Another advantage of my improved construction resides in the fact that if a rotor member having the old integral lip construction 20 is spoiled by reason of the lip cracking or being otherwise injured, the member can be remachined to provide a socket as 25 and a groove as 26 to receive a holding ring as 27. In other words by reason of my improved construction I am able in many cases to save expensive turbine parts which would otherwise have to be discarded.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. In combination, a pair of annular members which are subjected to different temperatures, one of said members having a portion of an annular socket of circular cross-section formed therein, an expansion ring connecting the members which has a circular enlargement on one extremity which enters the socket, a holding ring which forms the remainder of the socket, means for securing the holding ring to its supporting member, and means for uniting the opposite extremity of the expansion ring and the second member.

2. In combination, a pair of annular members, one of which has a portion of an annular socket formed therein and also an annular lip adjacent said socket, an expansion ring for connecting the members which has a circular enlargement on one edge which enters the socket, a holding ring which forms the remainder of the socket and is secured to its supporting member by said lip, and means for uniting the opposite extremities of the expansion ring and the second member.

3. In combination, an annular member which has a portion of an annular socket formed therein and also an annular lip adjacent said socket, an expansion ring for connecting the member to another which has a circular enlargement on one edge which enters the socket, and a holding ring which forms the remainder of the socket, is of softer material than its supporting member and is secured in place by said lip.

4. In combination, an annular member which has a portion of an annular socket formed therein and also an annular lip adjacent said socket, an expansion ring for connecting the member to another which has a circular enlargement at one extremity which enters the socket, depressions in the ring which act as key slots, and a holding ring which forms the remainder of the socket, has projections entering the depressions to form keys, and is secured to its supporting member by said lip.

5. In combination, an annular member, which has a portion of an annular socket formed therein and also an annular lip adjacent said socket, an expansion ring for connecting the member to another which has a circular enlargement on one extremity which enters the socket, depressions in the ring which act as key slots and a holding ring which forms the remainder of the socket, has projections on one of its faces entering said depressions in the member to form keys and also depressions in its other face to receive projections on said lip which lip holds the ring in place.

6. In an elastic fluid turbine, the combination of a rotor comprising concentric members which are subject to different temperatures, each of said members having a portion of an annular socket formed therein and an annular groove and lip formed adjacent the socket, an expansion ring having enlarged extremities which are seated in the sockets, and holding rings located in the grooves and held by the lips whose outer portions form the remainder of the sockets.

7. In an elastic fluid turbine, the combination of a rotor comprising concentric members which are subjected to different temperatures, each of said members having a portion of an annular socket formed therein and an annular groove and lip formed adjacent the socket, an expansion ring having enlarged extremities which are seated in the sockets, and holding rings located in the grooves and held by the lips whose outer portions form the remainder of the sockets, key means to prevent relative angular movement of the expansion and holding rings, and other key means to prevent relative angular movement of the holding rings and lips.

In witness whereof, I have hereunto set my hand.

CHRISTIAN STEENSTRUP.